3,052,686
B,B',B"-TRIS(PYRIDINIUM HALIDE)- AND B,B',B"-
  TRIS(QUINOLINIUM HALIDE)-BORAZINES AND
  A PROCESS FOR THEIR PREPARATION
James J. Harris, Oakmont, Pa., assignor to Koppers
  Company, Inc., a corporation of Delaware
No Drawing. Filed July 18, 1960, Ser. No. 43,283
           10 Claims. (Cl. 260—296)

This invention relates to new quaternary borazine salts and to the method of their preparation. In one specific aspect, it relates to novel quaterary salts made by reacting a B-trihaloborazine with an azaaromatic heterocycle containing only one annular nitrogen atom.

In recent years, there has been considerable interest in the art relating to boron-nitrogen compounds, particularly those containing a borazine nucleus. B-trichloroborazine has become commercially available and various substituted borazines derived therefrom have been found to be useful as fuel additives, hydraulic fluids, and in the preparation of optical bleaches and antioxidants. Gould, in U.S. Patent 2,754,177, described and claimed a class of B-triaminoborazines, useful as fuel additives and for other purposes, made by reacting primary or secondary amines with B-trihaloborazines. Turner et al., Chem. and Ind., page 526 (1958) reported a reaction between boron trichloride-primary amine adducts and tertiary amines to form amino substituted borazines.

Quite surprisingly, in view of the teachings of prior workers, I have discovered a new class of B-substituted borazines wherein one or more of the boron atoms of the borazine nucleus is attached to a quaternized nitrogen atom. My new compounds, which are the first known borazines containing an onium nitrogen, are useful dye intermediates in the preparation of fiber reactive dyestuffs as explained in detail hereafter and, in addition, they are potent biocides. My novel quaternary structure has a three-fold advantage over the parent borazine compounds, i.e. (1) greater dispersibility in water, (2) greater resistance to solvolysis, especially hydrolysis, and (3) greater control of reactivity under milder metathetical conditions.

It is therefore an object of the present invention to provide a unique class of quaternary borazine salts and a method for their preparation.

In accordance with the invention, I have discovered novel quaternary borazine salts characterized by the formula:

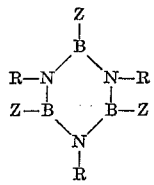

In the above formula at least one Z is the onium halide of a quaternized azaaromatic containing only one annular nitrogen and from 5–10 carbon atoms. Those Z's not representing the quaternized azaaromatic, if any, are halogen and R is a member selected from the group consisting of hydrogen, lower alkyl, aryl and substituted aryl, wherein the substituents affixed to the aryl nucleus are members selected from the group consisting of nitro, halo and lower alkyl. The term "onium halide of a quaternized azaaromatic containing only one annular nitrogen and from 5–10 carbon atoms" thus embraces the quaternary halide residues of pyridine, lutidine, picoline, quinoline, isoquinoline, quinaldine, and the like and could be represented by the following structural formulas:

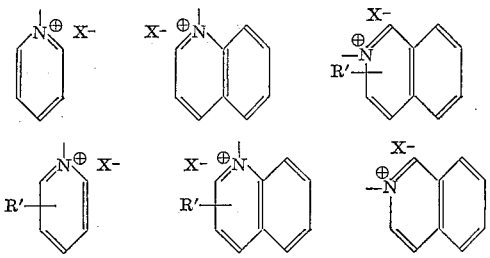

wherein R' is lower alkyl and X is halogen.

The compounds of the invention are made by reacting a B-trihaloborazine of the formula:

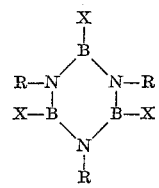

wherein R and X are as defined aforesaid with an azaaromatic heterocycle containing only one annular nitrogen atom and from 5–10 carbon atoms. Such azaaromatics include pyridine, quinoline, isoquinoline and the alkyl substituted pyridines, quinolines and isoquinolines.

The mole ratio of the reactants used in the new process depends on the particular quaternized product desired. In order to obtain complete substitution, at least 3 moles of azaaromatic are reacted with each mole of B-trihaloborazine. If only one mole of azaaromatic per mole of B-trihaloborazine is used, the resulting product contains one quaternized substituent and two halo substituents attached to the boron atoms. Approximately one mole of azaaromatic per mole of B-trihaloborazine should be used to obtain the maximum yield of the mono-substituted quaternized product. There is no theoretical upper limit on the amount of azaaromatic present, since a large excess thereof serves as a solvent for the reaction.

In addition to the use of excess azaaromatic heterocycle as a solvent, reaction is facilitated by the use of inert nonpolar solvents in which the borazine is soluble and which do not react with the azaaromatic. Thus, suitable solvents include hydrocarbons, such as cyclohexane, heptane, and decane; aromatic hydrocarbons, such as benzene, toluene, and xylene; chlorinated hydrocarbons, such as trichlorobenzene, trichloroethylene and the like; nitro aromatics, such as nitrobenzene; ethers, such as ethyl ether, butyl ether, and dioxane; and amides, such as dimethylformamide and the like.

The temperature required for the reaction varies with the reactivity of the halogen atom affixed to the B-trihaloborazine and also with the extent to which the reactant borazine is sterically hindered. For example, reaction between pyridine and B-tribromoborazine begins on admixing the two materials at room temperature (ca. 25° C.). If, instead of the B-tribromoborazine, a N-organo-B-trichloroborazine is used as the reactant, there is little or no reaction below about 70° C. The upper temperature limit depends on the stability of the reactants and products. Generally speaking, temperatures up to about 200° C. are safe operating temperatures; thus, unless an extremely high boiling solvent is used, the reaction is most conveniently run at the reflux temperature of the reaction mixture.

From the standpoint of economy of operation, the reaction is preferably conducted at atmospheric pressure. The use of vacuum is not helpful, although superatmospheric pressures can be used if desired. The higher pressures are sometimes useful in promoting reaction between the azaaromatic and the more sterically hindered borazines.

The reaction time depends to a large extent upon the temperature chosen. At higher temperatures, some reaction occurs substantially instantaneously, although it is best to provide a sufficient period of time, for example, from about one to several hours, to permit the reaction to go to completion.

The product quaternary borazine salts are high melting solids which, in contrast with the parent borazines, are more readily water soluble and more stable to hydrolysis. In general, the quaternary salts of the invention are organic solvent insoluble. For this reason, the presence of the inert non-polar solvent during the reaction facilitates product work-up, since the desired product simply precipitates from solution and it is easily recovered by conventional separation techniques.

Consideration has been given by workers in the art to using B-trihaloborazines as intermediates in the production of fiber reactive dyes. Unfortunately, they are not useful as such because of their water sensitivity and instability under alkaline conditions. Moreover, in attempts to fix the haloborazine nucleus to the cellulosic fiber, the acids produced by any reaction between the B-halo groups and the —OH of the cellulose result in a tendering and an ultimate degradation of the fiber. Astonishingly, the quaternized borazines of the invention are remarkably effective as intermediates in the production of excellent fiber reactive dyestuffs. For example, useful dyestuffs are made by substituting one or two of the halo groups attached to the boron atoms of the borazine ring with a suitable chromophore, e.g. an aminoazo dyestuff, and reacting the remaining halo groups with an azaaromatic according to the method of the invention to produce partially quaternized structures. As I have noted, the borazines containing an onium nitrogen are relatively stable to hydrolysis and, upon reaction with the cellulose, the free amine produced neutralizes any acid released.

My novel compounds also possess remarkable biocidal properties, which make them useful in a variety of applications. For example, the new compounds can be applied to paper from an aqueous dispersion of suitable concentration. The treated paper is then air dried and baked at 100–105° C. for a short period of time to give a fixed grain, biocidal paper uniformly impregnated and resistant to water leaching.

My invention is further illustrated by the following examples:

Example I

To a stirred solution of 10 g. (0.032 mole) B-tribromoborazine in 50 ml. substantially anhydrous benzene in a 100 ml. round bottom flask was added 8.3 g. (0.105 mole) substantially anhydrous pyridine. After the addition of pyridine was complete, the resulting mixture was refluxed and thereafter cooled. The light gray product was easily recovered by filtration of the precipitate, followed by removal of occluded solvent and excess pyridine at reduced pressure. This product, in contrast with B-tribromoborazine, has greatly reduced water-sensitivity and has the lack of definitive melting point which is characteristic for a quaternary compound. The product was identified by its gain in weight and infrared analysis, which indicated the following structural formula:

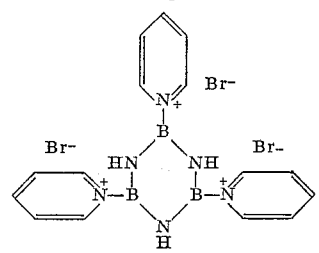

Example II

A 250 ml. round bottom flask was charged with 9 g. (0.0398 mole) N-trimethyl-B-trichloroborazine, 100 ml. cyclohexane, and 25 g. (0.31 mole) pyridine. A slight initial reaction occurred, after which the mixture was refluxed for several hours. Then solvent and excess pyridine were removed at reduced pressure to give 13.6 g. product. This borazine had added 1.46 moles pyridine per mole of borazine, thus representing a mixture of partially quaternized products, i.e.:

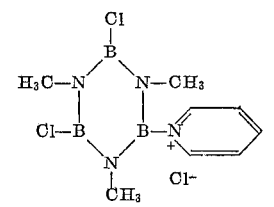

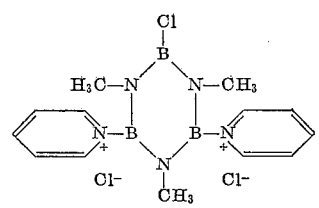

Example III

The procedure of Example II was substantially repeated, using N-tri-m-nitrophenyl-B-trichloroborazine, 10 g. (0.0183 mole), as the azaaromatic reactant. After removal of solvent and excess pyridine, 13.7 g. product was recovered, indicating reaction of 3.7 g. (0.0465 mole) pyridine or 2.54 moles pyridine per mole of borazine. The product, chemically, B,B'B''-tris(pyridinium chloride)-N,N',N''-tris(-m-nitrophenyl) borazine, was identified as in the previous examples.

Example IV

To 11.7 g. (0.0635 mole) B-trichloroborazine in a 100 ml. round bottom flask was added 65 ml. of pyridine and the mixture heated at 75° C. for 2 hours. After this time, the flask was placed under reduced pressure and excess pyridine withdrawn. After 24 hours, the total weight of product, including a small amount of occluded pyridine, was 29 g. The product, B,B',B''-tris(pyridinium chloride) borazine, appeared as a white solid, softening at 160–165° C. and finally melting at 175–180° C. It was identified by infrared analysis to have the indicated structure.

I claim:
1. A compound of the formula:

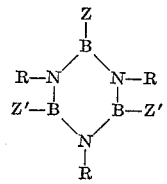

wherein Z is a member selected from the group consisting of quaternary ammonium halide residues of pyridine, picoline, lutidine, quinoline, isoquinoline, and quinaldine, the nitrogen atom of said member being bonded directly to the boron atom, Z' is a member selected from the group consisting of halogen and Z, the nitrogen atom of said member being bonded directly to the boron atom, and R is a member selected from the group consisting of hydrogen, lower alkyl, phenyl and nitrophenyl.

2. B.B',B'' - tris - (pyridinium chloride) - N.N',N''-tris-(m-nitrophenyl) borazine.
3. B-chloro-B',B''-bis-(pyridinium chloride)-N,N',N''-trimethyl-borazine.
4. B,B'-dichloro-B''-pyridinium chloride-N,N',N''-trimethyl-borazine.
5. B,B',B''-tris(pyridinium chloride) borazine.
6. B,B',B''-tris(pyridinium bromide) borazine.
7. A method of making a quaternary ammonium borazine salt characterized by the formula:

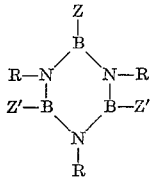

wherein Z is a member selected from the group consisting of the quaternary ammonium halide residues of pyridine, picoline, lutidine, quinoline, isoquinoline and quinaldine, the nitrogen atom of said member being bonded directly to the boron atom, Z' is a member selected from the group consisting of halogen and Z, the nitrogen atom of said member being bonded directly to the boron atom, and R is a member selected from the group consisting of hydrogen, lower alkyl, phenyl and nitrophenyl, comprising reacting a compound of the formula:

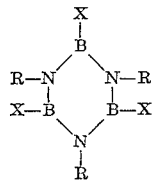

wherein R is as defined aforesaid and X is a halogen, with an azaaromatic heterocycle selected from the group consisting of pyridine, picoline, lutidine, quinoline, isoquinoline and quinaldine, and recovering said quaternary ammoniumborazine salt from the reaction mixture.

8. Method according to claim 7 wherein said compound of the formula:

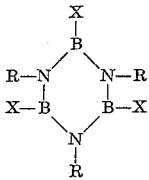

is reacted with said azaaromatic heterocycle in an equimolar ratio.

9. Method according to claim 7 wherein said compound of the formula:

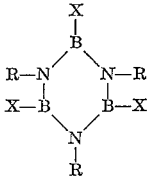

is reacted with said azaaromatic heterocycle in a 1:2 ratio, respectively.

10. Method according to claim 7 wherein said compound of the formula:

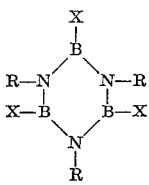

is reacted with said azaaromatic heterocycle in a 1:3 ratio, respectively.

No references cited.